United States Patent [19]

Stein et al.

[11] 4,275,048
[45] Jun. 23, 1981

[54] PROCESS FOR THE PREPARATION OF FINE DROPLET-REACTED ALUMINOSILICATES OF THE SMALLEST PARTICLE SIZE

[75] Inventors: Werner Stein; Peter Christophliemk, both of Düsseldorf, Fed. Rep. of Germany

[73] Assignees: Henkel Kommanditgesellschaft auf Aktien, Düsseldorf-Holthausen; Deutsche Gold- und Silber Scheideanstalt vormals Roessler, Frankfurt am Main, both of Fed. Rep. of Germany

[21] Appl. No.: 105,255

[22] Filed: Dec. 19, 1979

[30] Foreign Application Priority Data

Dec. 27, 1978 [DE] Fed. Rep. of Germany ....... 2856278

[51] Int. Cl.³ ....................... C01B 33/26; C01B 33/28
[52] U.S. Cl. ...................................... 423/329; 423/328
[58] Field of Search ................................ 423/328, 329

[56] References Cited

U.S. PATENT DOCUMENTS

| | | | |
|---|---|---|---|
| 4,016,097 | 4/1977 | Smith | 423/329 X |
| 4,041,135 | 8/1977 | Williams et al. | 423/329 |
| 4,071,377 | 1/1978 | Schwuger et al. | 423/329 X |
| 4,073,867 | 2/1978 | Roebke et al. | 423/328 X |
| 4,092,261 | 5/1978 | Sperling et al. | 423/329 |
| 4,126,579 | 11/1978 | Flaherty | 252/455 Z |

*Primary Examiner*—Edward J. Meros
*Attorney, Agent, or Firm*—Hammond & Littell, Weissenberger and Muserlian

[57] ABSTRACT

A process for the preparation of fine droplet-reacted sodium aluminosilicates with the smallest particle sizes, containing less than 0.1% by weight of granules exceeding 25 μm in size, said aluminosilicates being insoluble in water and containing some bound water, of the general formula $$xNa_2O \cdot Al_2O_3 \cdot y\, SiO_2$$

in which x is a number from 0.2 to 1.5 and y is a number from 1.5 to 10, prepared by reacting aqueous sodium aluminate with aqueous sodium silicate in the presence of an excess of aqueous sodium hydroxide and subsequent filtration, comprising the step of separately passing a solution of sodium aluminate with a composition corresponding to the molar ratios:

$$1\ Al_2O_3 : 1\ \text{to}\ 10\ Na_2O : 20\ \text{to}\ 200\ H_2O$$

and a solution of sodium silicate with a composition corresponding to the molar ratios:

$$Na_2O : SiO_2 \text{ from } 0.1 \text{ to } 10 \text{ and}$$

$$H_2O : SiO_2 \text{ from } 5 \text{ to } 200$$

to a spray head, spraying the two solutions into intimate contact, at a ratio by weight corresponding the desired total composition within the molar ratios of:

$$1.5 \text{ to } 15\ Na_2O : 1\ Al_2O_3 : 1 \text{ to } 15\ SiO_2 : 50 \text{ to } 400\ H_2O$$

at a temperature of between 0° and 103° C., employing a spray system with at least one spray head with at least two liquid channels, each terminating in a jet spray nozzle, one for each solution, in such a manner that the two solutions meet only after leaving the spray head at a velocity sufficient to form a fine mist of droplets, whereby the two reactants undergo reaction while still in the fine mist of droplets stage, with the formation of an X-ray-amorphous sodium aluminosilicate gel, allowing the droplets to settle and recovering an aqueous suspension of said X-ray-amorphous sodium aluminosilicate in a form adapted for crystallization.

19 Claims, 3 Drawing Figures

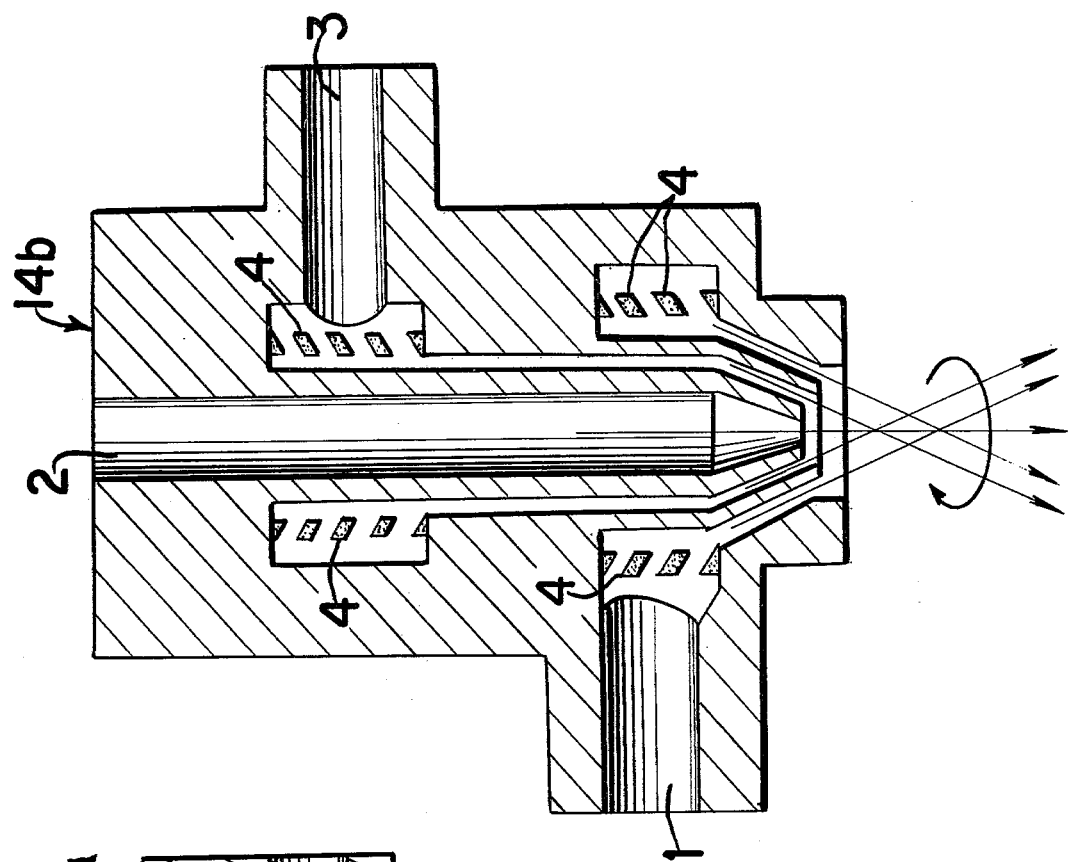
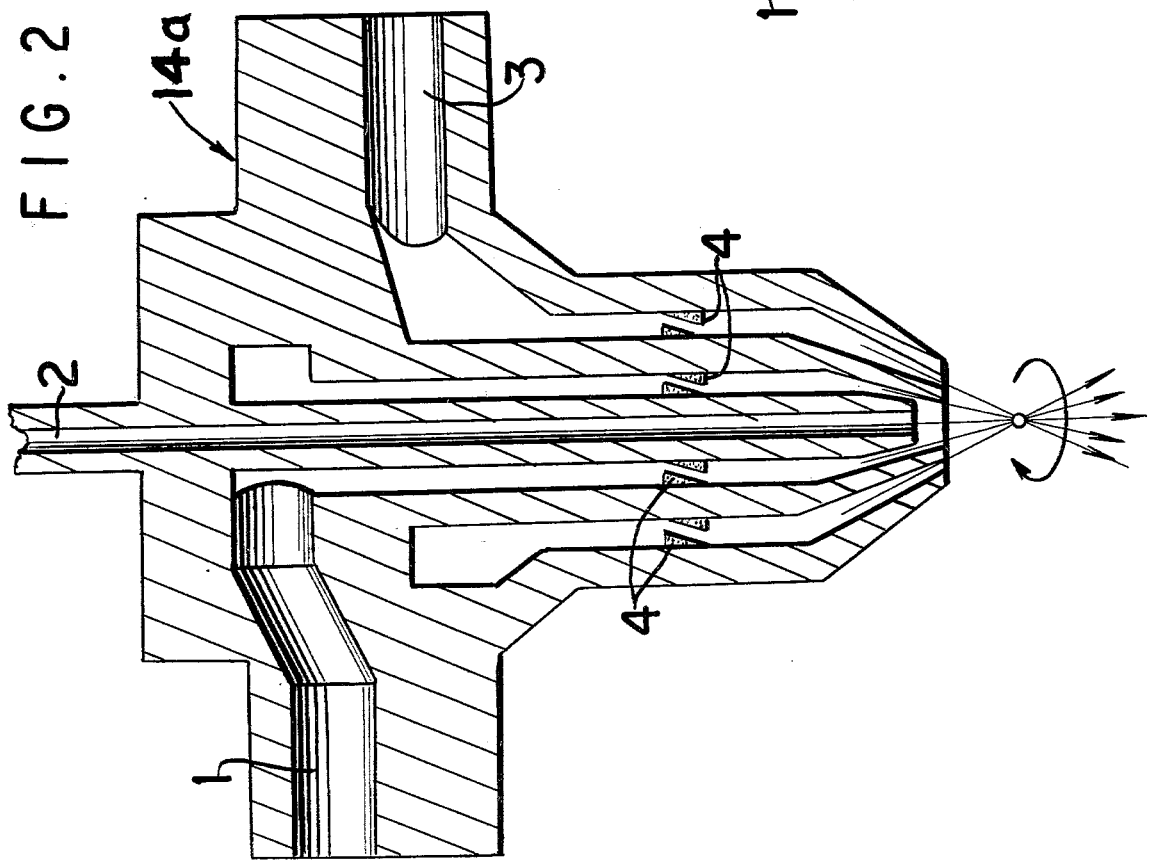

PROCESS FOR THE PREPARATION OF FINE DROPLET-REACTED ALUMINOSILICATES OF THE SMALLEST PARTICLE SIZE

BACKGROUND OF THE INVENTION

The object of the invention is a process for the continuous preparation of sodium aluminosilicates that have the smallest particle size, still contain bound water and have a proportion of less than 0.1% by weight of material with a grain size exceeding 25 μm, on mixing sodium aluminate dissolved in water with sodium silicate dissolved in water, in the presence of excess sodium hydroxide solution.

Alkali metal aluminosilicates are characterized in the conventional way of describing oxides by the general empirical formula $$x\text{Kat}_{2/n}\text{O}.\text{Al}_2\text{O}_3.y\text{SiO}_2.z\text{H}_2\text{O}.$$

In this oxide formula, Kat is a cation of the valency n, which is exchangeable with other cations, such as an alkali metal, x is a number from 0.2 to 1.5 and preferably about 1, y is a number exceeding 1.5. The content of water depends on the degree of drying. The above formula includes a large number of substances that frequently differ only insignificantly in their chemical composition but considerably with respect to their structure and properties. The x-ray diffraction diagram usually is employed for the identification of crystalline types, in addition to the chemical composition.

Technically interesting are mainly those synthetic alkali metal aluminosilicates that possess a three-dimensionally cross-linked aluminosilicate lattice. In the anionic lattice formed from $SiO_2$, part of the silicon(IV)-atoms is replaced by aluminum(III)-atoms; the missing charge is balanced with cations—one univalent cation each per aluminum atom in the lattice. The so-called zeolites form a mineral class of alkali metal aluminosilicates containing water of crystallization with defined pore and spatial structure of their aluminosilicate lattice. "Molecular sieves" are only those zeolites that are used technically for the separation of materials because of these lattice properties. Synthetic zeolites are increasingly gaining in technical importance and are utilized as cation exchange agents mainly for the softening of water, as catalysts in chemical processes, as drying, separating or adsorption agents for solvents and gases and as heterogeneous inorganic builders in washing and cleaning agents. Depending on the purpose of application, different types, having different degrees of dryness and purity are needed. Normally, such molecular sieves initially are prepared in their sodium form and subsequently converted into other forms by ion exchange. For the technically important molecular sieve types A and X, which are often labelled differently in the literature, the terms NaA and NaX, respectively, are employed, for example, for the sodium forms, and the terms KA and KX, respectively, are employed for the potassium forms.

The two molecular sieve types NaA and NaX have special technical significance. The chemical composition of the molecular sieves of the type NaA corresponds to the molecular formula $$1\pm0.2\text{Na}_2\text{O}.1\text{Al}_2\text{O}_3.2\pm0.5\text{SiO}_2.0 \text{ to } 6\text{H}_2\text{O},$$

that of the molecular sieve type NaX, which is richer in silicate, to the formula $$0.9\pm0.2\text{Na}_2\text{O}.1\text{Al}_2\text{O}_3.2.5\pm0.5\text{SiO}_2.0 \text{ to } 8\text{H}_2\text{O}.$$

The x-ray diffraction diagram of molecular sieve NaA is described, for example, in the German published patent applications DE-AS No. 10 38 015 and DE-AS No. 10 38 017, that of molecular sieve NaX, in DE-AS No. 10 38 016, corresponding to U.S. Pat. No. 2,882,244.

An additional zeolitic sodium aluminosilicate with increasing technical importance is the cubic molecular sieve P, which is richer in silicate. This zeolite is also known as "Zeolite $P_c$" or "Molecular Sieve B". The chemical composition of molecular sieve P corresponds to the molecular formula $$0.9\pm0.2\text{Na}_2\text{O}.1\text{Al}_2\text{O}_3.4\pm1.3\text{SiO}_2.0 \text{ to } 6\text{H}_2\text{O}.$$

The x-ray diffraction diagram is shown, for example, in D. W. Breck, "Zeolite Molecular Sieves", New York 1974, page 365.

The x-ray diffraction diagram of hydrosodalite ("Zeolite HS") is also found there (page 360). This sodium aluminosilicate also has a lattice structure and chemical composition similar to the type NaA, but it is not usually included among the zeolites since a corresponding pore structure is missing. The hydrosodalite is an undesirable byproduct in many molecular sieve syntheses since it has a weaker cation exchange capacity.

These and other sodium aluminosilicates of various types are produced technically mainly in such a manner that the aluminate and silicate components dissolved completely and preferably with the use of excess sodium hydroxide solution, are combined and thoroughly mixed with vigorous agitation above room temperature, while maintaining certain molar and concentration ratios in the batch. The initially forming aluminosilicate gel is broken up by the application of strong shearing forces into an agitatable sol. The resulting x-ray-amorphous sodium aluminosilicate precipitates are subsequently crystallized under defined crystallization conditions. Depending on the purpose for which they are to be used, these sodium aluminosilicates are filtered, freed from excess alkali and dried. Several forms of this hydrothermal synthesis are listed in D. W. Breck (cf. above), others are described, for example, in the German published patent application disclosures DE-OS Nos. 16 67 620, 20 28 163, 22 00 745, 23 05 993, 23 33 068, 25 14 399, 26 05 083 and 26 05 113. Examples for the preparation of x-ray-amorphous sodium aluminosilicates for special purposes are found in the German published patent application disclosures DE-OS Nos. 17 17 158 and 25 49 659.

The distribution of the particle size of the utilized sodium aluminosilicate powder is very important for most purposes, particularly when it is employed in aqueous suspension, for example, for adsorption and exchange properties, sedimentation rate, abrasivity as well as the behavior of the residue on smooth surfaces or textiles. The smallest possible powder particles are desired in the majority of these cases. An additional requirement for use in washing, rinsing and cleaning agents, for example, is the absence of any measurable content of particles exceeding 25 μm. This content, which is determined according to DIN 53 580 by wet screening according to Mocker, is called grit.

So far, only few data providing information in figures concerning the granule size distribution of sodium aluminosilicates are known from the literature. Most of the literature references refer to the technically important molecular sieve NaA. A characteristic distribution curve for type NaA (="4A") is found in D. W. Breck, "Zeolite Molecular Sieves", New York 1974, page 388. According to this, the major proportion of the particles lies below 4 μm. However, considerably larger crystal particles than those of the similar molecular sieve types NaA and NaX are found in molecular sieve P, with particle sizes normally above 5 μm (cf. Taylor and Roy, "The American Mineralogist", vol. 49, 1964, page 662). These particle sizes were determined by electron microscope, however.

Suspensions of previously dried sodium aluminosilicates in powder form may contain considerably larger particles, however. Conventional methods for the determination of the particle size distribution are based either on the different sedimentation of particles of different size (sedimentation analysis) or on the electronic measuring of the volumes of the particles suspended in a test electrolyte by means of the disturbance of an electrical field in the counter aperture (counting by Coulter-Counter ®).

Processes for the preparation of grit-less, zeolite powder of type A, consisting of fine particles and having defined particle size spectra and contents of 50% by weight of particles smaller than 4.9 μm (or 6.2 μm, 4.3 μm, 5.9 μm and 4.0 μm, respectively), are described in the German published patent application disclosures DE-OS Nos. 26 51 419, 26 51 420, 26 51 436, 26 51 437 and 26 51 485. In German published patent application disclosure DE-OS No. 25 14 399, the preparation of a low-grit zeolite molecular sieve powder with a mean granule diameter below 10 μm, determined by sedimentation analysis, is described. Here the aqueous medium surrounding the crystallization product is adjusted to a pH between 8.5 and 11 before drying.

OBJECTS OF THE INVENTION

An object of the present invention is the development of a process for the preparation of grit-free, preferably zeolitic, cation-exchanging sodium aluminosilicates.

Another object of the present invention is the development of a process for the preparation of grit-free, preferably zeolitic, cation-exchanging sodium aluminosilicates with still smaller particles, preferably of type NaA, NaX and P, which permits a continuous procedure with a high yield per space and time, without the application of strong shearing forces.

A yet further object of the present invention is the development of a process for the preparation of fine droplet-reacted sodium aluminosilicates with the smallest particle sizes, containing less than 0.1% by weight of granules exceeding 25 μm in size, said aluminosilicates being insoluble in water and containing some bound water, of the general formula $$xNa_2O \cdot Al_2O_3 \cdot ySiO_2$$

in which x is a number from 0.2 to 1.5 and y is a number from 1.5 to 10, prepared by reacting aqueous sodium aluminate with aqueous sodium silicate in the presence of an excess of aqueous sodium hydroxide and subsequent filtration, comprising the step of separately passing a solution of sodium aluminate with a composition corresponding to the molar ratios:

$$1Al_2O_3:1 \text{ to } 10Na_2O:20 \text{ to } 200H_2O$$

and a solution of sodium silicate with a composition corresponding to the molar ratios:

$$Na_2O:SiO_2 \text{ from } 0.1 \text{ to } 10 \text{ and}$$

$$H_2O:SiO_2 \text{ from } 5 \text{ to } 200$$

to a spray head, spraying the two solutions into intimate contact, at a ratio by weight corresponding the desired total composition within the molar ratios of:

$$1.5 \text{ to } 15 \text{ } Na_2O:1Al_2O_3:1 \text{ to } 15SiO_2:50 \text{ to } 400H_2O$$

at a temperature of between 0° and 103° C., employing a spray system with at least one spray head with at least two liquid channels, each terminating in a jet spray nozzle, one for each solution, in such a manner that the two solutions meet only after leaving the spray head at a velocity sufficient to form a fine mist of droplets, whereby the two reactants undergo reaction while still in the fine mist of droplets stage, with the formation of an X-ray-amorphous sodium aluminosilicate gel, allowing the droplets to settle and recovering an aqueous suspension of said X-ray-amorphous sodium aluminosilicate in the form adapted for crystallization.

These and other objects of the present invention will become apparent as the description thereof proceeds.

THE DRAWING

FIG. 2 and FIG. 3 are cross-sectional views of two types of sprayheads, employed in the process of the invention.

DESCRIPTION OF THE INVENTION

Figure 1:
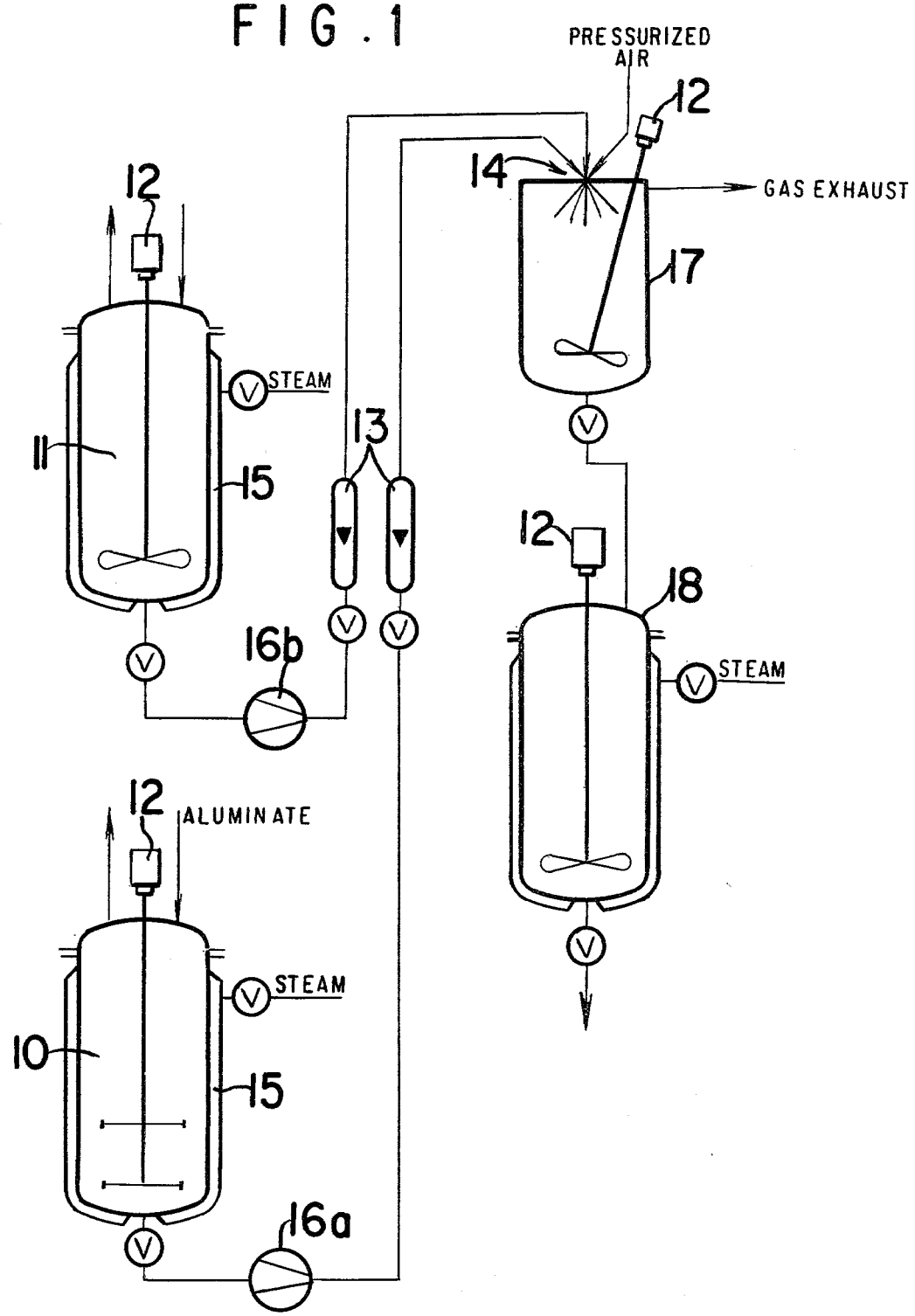
FIG. 1 is a flow diagram of the process of the invention.

The drawbacks of the prior art have been overcome and the above objects have been achieved by the process of the present invention.

The process of the invention is a process for the continuous preparation of sodium aluminosilicates with the smallest particles which are insoluble in water and contain bound water, of the general formula:

$$xNa_2O \cdot Al_2O_3 \cdot ySiO_2,$$

in which x is a number from 0.2 to 1.5 and y is a number from 1.5 to 10, which contain less than 0.1% by weight of granules exceeding 25 μm in size, as prepared by mixing sodium aluminate dissolved in water with sodium silicate dissolved in water in the presence of excess sodium hydroxide solution and subsequent filtration of the reaction product, which improved process is characterized by the fact that an aluminate solution with a composition corresponding to the molar ratios:

$$1Al_2O_3:1 \text{ to } 10Na_2O:20 \text{ to } 200 \text{ } H_2O$$

as well as a silicate solution with a composition corresponding to the molar ratios:

$$Na_2O:SiO_2 \text{ from } 0.1 \text{ to } 10 \text{ and}$$

$$H_2O:SiO_2 \text{ from } 5 \text{ to } 200$$

are sprayed together, at a ratio by weight corresponding to a calculated total composition with respect to the molar ratios of 1.5 to 15Na$_2$O:1Al$_2$O$_3$:1 to 15SiO$_2$:50 to 400H$_2$O at a temperature in the range from 0° to 103° C., with the use of a jet system with at least two liquid channels in which the aluminate and silicate solutions are led separately to the jet opening, in such a manner that the two solutions meet only after leaving the jet opening and react with each other while still in the sprayed stream, with the formation of an x-ray-amorphous sodium aluminosilicate gel.

More particularly, the present invention relates to a process for the preparation of fine droplet-reacted sodium aluminosilicates with the smallest particle sizes, containing less than 0.1% by weight of granules exceeding 25 μm in size, said aluminosilicates being insoluble in water and containing some bound water, of the general formula $$x\text{Na}_2\text{O}\cdot\text{Al}_2\text{O}_3\cdot y\text{SiO}_2$$

in which x is a number from 0.2 to 1.5 and y is a number from 1.5 to 10, prepared by reacting aqueous sodium aluminate with aqueous sodium silicate in the presence of an excess of aqueous sodium hydroxide and subsequent filtration, comprising the step of separately passing a solution of sodium aluminate with a composition corresponding to the molar ratios:

1Al$_2$O$_3$:1 to 10Na$_2$O:20 to 200 H$_2$O and a solution of sodium silicate with a composition corresponding to the molar ratios:

Na$_2$O:SiO$_2$ from 0.1 to 10 and

H$_2$O:SiO$_2$ from 5 to 200 to a spray head, spraying the two solutions into intimate contact, at a ratio by weight corresponding the desired total composition within the molar ratios of:

1.5 to 15Na$_2$O:1Al$_2$O$_3$:1 to 15SiO$_2$:50 to 400H$_2$O at a temperature of between 0° and 103° C., employing a spray system with at least one spray head with at least two liquid channels, each terminating in a jet spray nozzle, one for each solution, in such a manner that the two solutions meet only after leaving the spray head at a velocity sufficient to form a fine mist of droplets, whereby the two reactants undergo reaction while still in the fine mist of droplets stage, with the formation of an X-ray-amorphous sodium aluminosilicate gel, allowing the droplets to settle and recovering an aqueous suspension of said X-ray-amorphous sodium aluminosilicate in a form adapted for crystallization.

In the process according to the invention, the aluminate and silicate components, fully dissolved with the use of excess sodium hydroxide solution, are thoroughly mixed by simultaneous spraying, through a suitable spray head aggregate, to form the smallest droplets possible, while maintaining certain molar and concentration ratios in the batch, and the sodium aluminosilicate formed in this manner in the droplets is recovered by allowing the droplets to settle and the precipitated sodium aluminosilicate is filtered off from the alkaline mother liquor, if necessary, washed until neutral and dried as desired.

The spraying of liquids, solutions, or suspensions is widespread, for example, for spray-drying, granulation, cooling or absorption. Also known is the use of spray head aggregates for neutralization reactions, mainly for the quick elimination of high heats of neutralization (as described in German published patent application DE-AS No. 23 26 440). Until now, however, the mixing of two highly alkaline solutions according to the process of the invention, whose mixing above room temperature results in a practically instantaneously produced gel-like reaction product, by simultaneous spraying through a suitable spray head aggregate in such a thorough manner that no further mixing operations are required, was completely unknown. Particularly noteworthy in the preparation of sodium aluminosilicate by the spray procedure according to the invention is the fact that the x-ray-amorphous sodium aluminosilicate gel obtained after the spray mixing does not have to be broken up by the application of strong shearing forces to initiate its conversion into a sol that can be crystallized. Sodium aluminosilicate powders with considerably smaller particles can be obtained by the spraying process according to the invention than by the precipitation procedures practiced until now, even with the application of great shearing energies.

The spraying ("atomization") of liquids, solutions or suspensions is a breaking down process requiring high relative velocities between gas and liquid. Only when the fluctuations of the pressure of the turbulent flow field overcomes the interfacial surface tension of the liquid, can the surface of the liquid tear open and a reduction to a fine mist of droplets can take place. In principle, it is immaterial whether the liquid or the gas or both is assigned a flow rate. Density, interfacial surface tension, viscosity and thickness of the stream of liquid as well as the enforced relative velocities influence the size of the droplet and its statistical distribution. Descriptions—in formulas—of the physical processes taking place in this process are found, for example, in the monographs "Sprühturmtechnik" ("Spray-Tower Technology") by Schubert and Vieweg, VEB Verlag für Grundstoffindustrie, Leipzig, 1969, and "Particulate Technology" by Orr, Jr., The Macmillan Company, New York 1966, Chapter 1, as well as in the literature cited therein.

In view of the widely varying products and purposes, an entire series of different spray head aggregates are known in the chemical industry. Besides the descriptions found in handbooks of technical chemistry and the abovementioned monographs, these types are described by Turck, Chemie-Ing.-Technik 25: pp. 620–622, 1953; Troesch, ibid. 26: pp. 311–320, 1954; Schubert and Vieweg, Chem. Technik 17: pp. 198–205, 1965; "Ullmanns Enzyklopädie der technischen Chemie", 4th ed., vol. 2, pp. 254–258, 1972, Verlag Chemie, Weinheim/Bergstrasse as well as in Kirk-Othmer, "Encyclopedia of Chemical Technology" 2d ed., vol. 18, pp. 639–652, 1969, J. Wiley & Sons.

According to these, there are basic differences between pressure jets that simply atomize by liquid pressure ("one-component jets"), rotational atomizers that atomize the material by centrifugal force and two-component jets in which the material is atomized with the aid of propellants (water, vapor, gas, but especially compressed air). Multicomponent jets belong to the two-component jets, based on the working principle.

These different aggregates, which are also used in different types of construction, have specific advantages and disadvantages, particularly with respect to the process according to the invention.

When only one spray head aggregate with only one liquid channel is attempted to be used for the spray process according to the invention, a mixing of the silicate component and aluminate component prior to entering the spray aggregate is required in the case of pressure jets, rotational sprayers as well as with two-component jets of conventional construction (one liquid channel, one pressure gas channel), for the formation of homogeneous gels. Thus an already mixed material giving alkali metal aluminosilicate is sprayed from the opening of the jet. This procedure results in difficulties with the equipment in the case of production of pure sodium aluminosilicates, since an almost instantaneous, strong precipitation occurs upon the combining of the sodium aluminate and sodium silicate solutions in the entire technically practical range, beginning at room temperature. High pump pressures are necessary to press these gel-like precipitates through the spray head aggregate. Even with uneconomically dilute batches with molar ratios of over 250 for the $H_2O:Al_2O_3$ ratio in the total precipitation batch and pump pressures of 4 bar, clogging cannot be prevented in jet systems with only one liquid channel.

It is necessary for the performance of the process according to the invention that, for this reason, the aluminate solution as well as the silicate solution are fed into the jet opening through separate liquid channels and sprayed together in such a manner that the two solutions meet and react with each other only after leaving the jet opening. Under these circumstances, it is important that both mixture of the two solutions and formation of a fine mist of droplets occur simultaneously. Such a reaction is encouraged if an inert gas propellant and dispersant is also excited by the spray head aggregate.

The simultaneous spraying of the two solutions with the aid of an inert compressed gas or propellant, preferably with a pressure in the range from 0.3 to 3 bar, was found suitable for this purpose. Compressed air, which also may be preheated, if desired, is used to advantage as the compressed gas or propellant.

The process according to the invention can be carried out, for example, with the use of two spray head aggregates with one liquid channel each, and one compressed gas channel each, if desired. The aluminate component and the silicate component are sprayed separately with one spray head aggregate each in such a manner that the spray cones overlap.

Much less subject to disturbances, and thus preferred for the invention, are so-called three component jets with two liquid channels and at least one compressed gas channel, in which the aluminate solution, the silicate solution and the propellant are fed separately into the jet and meet only after leaving the jet opening. A clogging of the tubes due to sodium aluminosilicate precipitates is improbable. Such three-component jets are commercially available.

The following general statements for the construction and use of such a multi-component jet can be obtained from the literature mentioned above:

(a) In the spray area, the velocity of the liquid stream must be adjusted to the lowest practicable rate and the velocity of the gas stream to the highest practicable rate.

(b) The cross-section of the aperture in the liquid channel must be chosen as large as feasible.

(c) The majority of the produced droplets is very small with a diameter of less than 50 $\mu m$; the mean droplet size becomes smaller with a rising ratio of gas to liquid.

(d) The otherwise relatively broad spectrum of droplets becomes narrower as the mean droplet size is reduced.

Multi-component jets are sprayers that use relatively large amounts of energy, but they produce the smallest particles, have the lowest rate of material wear and are less subject to clogging because of the large-bore cross-sections. Technically preferred are the so-called external spray jets, which operate so that the propellant hits the liquid stream only outside the spray equipment. The combinations of internal spray jets and external spray jet (Kirschbaum-jet), which require the lowest gas pressure (0.2 to 0.4 bar), produce the relatively narrowest droplet spectrum and markedly reduce wear and tear in contrast to a purely internal spray jet. The purely external spray jets are divided into those with straight-line and rotating gas guidance. The straight-line gas guidance produces a narrow spray cone and the acceleration of the particles by the gas is maintained for several meters. Besides, a slight excess pressure exists in the liquid channels. In contrast to this, a partial pressure generally exists in the jet tube of the so-called compressed air spiral jets.

The gas pressure range of the compressed air jets is very broad (0.3 to approximately 7 bar); the exit speed of the gas usually is 100 to about 250 meters per second. The amount by weight of the compressed air needed for the spraying generally is of the same order of magnitude as that of the liquid to be sprayed.

A variant of the three-component jet, which is suitable for the process according to the invention as well, is described in the German published patent application DE-OS No. 24 19 148. A waterspray jet, which is trained at close range on the opening of the three-component jet having a compressed air channel and two circular channels for liquids, removes interfering deposits ("beards") at the jet opening.

The output of two-component or multi-component jets is limited. Normally, not more than about 100 liters of liquid can be sprayed per hour. Higher throughput amounts can be reached easily, however, by increasing the number of jets. With an increased number of jets, replacement of a single two-or multi-component jet during the operation causes only a minor drop in the production rate for a few minutes.

The spray production of sodium aluminosilicate according to the invention requires equipment consisting of two receiving vessels for the aluminate and the silicate solutions respectively, two pumps and dosing mechanisms for the two solutions, a spray head aggregate and a collection and precipitation vessel. The parts that come in contact with the product should be of stainless steel. The receivers for the aluminate- and silicate solutions are appropriately fitted with heating devices, either a heating jacket or a heating coil for heating with steam. A direct blowing in of steam is also possible, if desired, in which case the added condensed water must be included in the calculation of the batch ratios to be used. The addition of an efficient agitator, particularly for the aluminate container, is necessary to make the receivers suitable for the preparation of the aluminate and silicate solutions. The two liquid components are transported to the spray aggregate by means of suitable alkali-resistant pumps. Depending on the type of pump to be used, the dosing may be carried out directly through pump adjustments or through valves controlled, for example, by rotameters.

For the reasons mentioned above, a three-component jet with two channels for liquids and a compressed air channel for external spraying are preferably used as spray head aggregate for the process according to the invention. The compressed air, added through a filter cartridge and reducing station, should have a control range from 0.3 to 3 bar. Equipment for the preheating of the compressed air is not necessary if control is possible, since the temperature can be adjusted more simply at the jet head, through the temperature of the liquid components. For the throughput of large amounts, several such jets can be arranged in a spray crown, in which the individual jets can be shut off separately to allow a fast replacement of a possibly clogged or defective jet without interruption of the continuous spray operation.

The actual precipitation vessel can be constructed like a spray tower, according to the state of the technology. Additional heating is then superfluous, particularly with the throughput of larger amounts. In contrast to technical spray-drying, the spent air contains few solid components and practically only water vapor, so that only cooling aggregates and no expensive cyclones are needed downstream. The spray vessel should be fitted with an agitator so that the sprayed droplets which settle to give the sodium aluminosilicate gel can be kept liquid by slow stirring.

Initially, a sodium aluminosilicate gel precipitates during the precipitating process according to the present state of the technology as well as during the spray process according to the invention. However, the gels obtained in these ways differ considerably from one another with respect to the resulting product characteristics, as well as to the operation of the process. The sprayed gel droplets settle and remain fluid even with very slow agitation. This reduced degree of aggregation or lower cohesion of the sprayed gel obviously can be attributed to the fact that the spray particles or droplets do not combine anymore to a cohesive gel. A spray result of this type is completely unexpected. The reduced degree of aggregation of the gel results in smaller particles and especially in the absence of grit, which is important for the application of the final product.

The x-ray-amorphous sodium aluminosilicate gel obtained according to the invention is preferably subjected to a subsequent crystallization by heating the gel prior to filtration, with agitation if desired, to a temperature in the range from 20° to 150° C. and maintaining this temperature until crystallization occurs.

Depending on the amount of flow, the crystallization of the x-ray-amorphous gel is suitably performed in separate crystallizing vessels, particularly with the continuous operation, as is possible in a simple manner with the spraying according to the invention. The crystallization vessel should be equipped with an agitator as well since slow agitation during crystallization has positive effects on the product quality (more uniform composition, greater crystallinity) of various zeolitic sodium aluminosilicate types (e.g. NaA). The crystallization temperature can be adjusted by jacket heat as well as by direct blowing in of steam in dependence on the desired type of product, e.g. NaA, NaX or P.

The optimal duration of the crystallization time also is dependent on the desired type of product. The crystallization is interrupted advantageously at the point in time at which the desired product has reached its maximal calcium-binding capacity. The determination of the calcium-binding capacity can be carried out by the methods reported in the literature, for example, the procedure described in German published patent application DE-OS No. 24 12 837 (page 27), corresponding to U.S. Patent application Ser. No. 956,851, filed Nov. 2, 1978 (page 31). The reduced state of aggregation of the primarily formed gel results in a significant shortening of the duration of the hydrothermal treatment necessary for complete crystallization. No comparably short crystallization times can be found in the entire literature on molecular sieve syntheses.

The crystallized product is filtered as well as washed neutral, if necessary, and dried. The strongly alkaline filtrate can be used again, if desired, together with (evaporated) wash water, for the preparation of the starting components. Depending on the intended purpose, a suspension of the crystallized sodium aluminosilicates may also be used directly, if desired, for the preparation of washing and cleaning agents, for example.

The molar ratio of $Al_2O_3$ to $SiO_2$ in the two solutions to be sprayed is adjusted advantageously in the process according to the invention so that it corresponds to the composition of the desired sodium aluminosilicate. It is possible, in this manner, with suitable selection of the reaction and crystallization conditions, to produce crystalline sodium aluminosilicates of the type NaA, NaX and P with a definite mean particle size.

A special form of the process according to the invention concerns the preparation of a crystalline sodium aluminosilicate of the type NaA with a mean particle size of less than 3 $\mu$m. This special form is characterized by the fact that an aluminate solution with a composition corresponding to the molar ratios $$1\ Al_2O_3\text{:}1\text{ to }4\ Na_2O\text{:}20\text{ to }200\ H_2O$$

as well as a silicate solution with a composition corresponding to the molar ratios $$Na_2O\text{:}SiO_2 \text{ from } 0.1 \text{ to } 3 \text{ and}$$

$$H_2O\text{:}SiO_2 \text{ from } 5 \text{ to } 50$$

are sprayed simultaneously at a ratio by weight corresponding to a calculated total composition with respect to the molar ratios of $$1.8\text{ to }6\ Na_2O\text{:}1\ Al_2O_3\text{:}1\text{ to }2.4\ SiO_2\text{:}50\text{ to }300\ H_2O$$

and that subsequently the formed sodium aluminosilicate gel is maintained for at least 10 minutes at a temperature in the range from 70° to 95° C., with agitation, until the formation of a crystalline sodium aluminosilicate occurs of the type NaA with a molar ratio of $$SiO_2\text{:}Al_2O_3 \text{ from } 1.8 \text{ to } 2.2$$

and a mean particle size of less than 3 $\mu$m.

In this special form of the process according to the invention, the calculated total composition of the two solutions to be sprayed is preferably adjusted so that it corresponds to molar ratios of $$3\text{ to }4\ Na_2O\text{:}1\ Al_2O_3\text{:}1.8\text{ to }2\ SiO_2\text{:}80\text{ to }100\ H_2O.$$

Also advantageous in this case is the warming of the two spray solutions as well as of the compressed gas, if desired, so that temperatures in the range from 60° to 80° C. are obtained in the spray stream.

Another special form of the process according to the invention concerns the preparation of a crystalline sodium aluminosilicate of the type NaX with a mean particle size of less than 2 μm. This special form is characterized by the fact that an aluminate solution with a composition corresponding to the molar ratios 1 $Al_2O_3$:1 to 5 $Na_2O$:20 to 200 $H_2O$ as well as a silicate solution with a composition corresponding to the molar ratios $Na_2O$:$SiO_2$ from 0.1 to 3 and $H_2O$:$SiO_2$ from 5 to 100 are sprayed simultaneously at a ratio by weight corresponding to a calculated total composition with respect to the molar ratios of 2.5 to 10 $Na_2O$:1 $Al_2O_3$:2.5 to 10 $SiO_2$:80 to 400 $H_2O$ and that subsequently the formed sodium aluminosilicate gel is maintained for at least one hour at a temperature in the range from 85° to 105° C. until the formation of a crystalline sodium aluminosilicate occurs of the type NaX with a molar ratio of $SiO_2$:$Al_2O_3$ from 2.4 to 3.2 and a mean particle size of less than 2 μm.

In this special form of the process according to the invention, the calculated total composition of the two spray solutions is preferably adjusted so that it corresponds to molar ratios of $SiO_2$:$Al_2O_3$ from 2.5 to 6

$Na_2O$:$SiO_2$ from 1.2 to 1.5

$H_2O$:$SiO_2$ from 35 to 100

Here, the two spray solutions as well as the compressed gas, if desired, are heated so that temperatures in the range from 60° to 95° C. are obtained in the spray stream.

A third special form of the process according to the invention concerns the preparation of a crystalline sodium aluminosilicate of type P of the cubic, cation-exchanging form with a mean particle size of less than 6 μm. This special form is characterized by the fact that an aluminate solution with a composition corresponding to the molar ratios 1 $Al_2O_3$:1 to 5 $Na_2O$:20 to 200 $H_2O$ as well as a silicate solution with a composition corresponding to the molar ratios $Na_2O$:$SiO_2$ from 0.1 to 3 and $H_2O$:$SiO_2$ from 5 to 100 are sprayed simultaneously at a ratio by weight corresponding to a calculated total composition with respect to the molar ratios of 1.5 to 10 $Na_2O$:1 $Al_2O_3$:3 to 10 $SiO_2$:100 to 400 $H_2O$ and that subsequently the formed sodium aluminosilicate gel is maintained for at least one hour at a temperature in the range from 90° to 105° C. until the formation of a crystalline sodium aluminosilicate occurs of type P of the cubic cation-exchanging form with a molar ratio of $SiO_2$:$Al_2O_3$ from 2.7 to 5.2 and a mean particle size of less than 6 μm.

In this special form, the calculated total composition of the two spray solutions is preferably adjusted so that the amount of $SiO_2$ and the total amount of $Na_2O$ corresponds to a molar ratio of $SiO_2$:$Na_2O$ from 1 to 2.5

The two spray solutions as well as the compressed gas, if desired, are heated advantageously so that temperatures in the range from 60° to 100° C. are obtained in the spray stream.

The process according to the invention, which is further explained below by examples, has the following advantages in comparison to the present state of the technology:

With reference to the equipment, the saving of a large and thus expensive precipitation aggregate with shear attachments for the intensive mixing of the components and breaking up of the resulting gel can be emphasized. The spraying, and thus the precipitation, can be operated continuously without any difficulties. Such a continuous method of operation in combination with the small size of a spray aggregate required and a relatively short subsequent crystallization time in comparison to precipitation processes, leads to a high space/time yield for the crystalline products.

With reference to the products, special advantages are seen in the obtaining of a uniform granule spectrum with very small particles and negligible proportions of grit. The process according to the invention is generally usable for molecular sieve syntheses. Particularly, the molecular sieve type NaA with a mean particle size of less than 3 μm, a proportion of granules larger than 10 μm, amounting to less than 3% by volume and a crystalline diameter of mainly less than 1 μm, can be prepared by the process according to the invention. Type NaX can be obtained even smaller according to the invention, with a mean particle size of less than 2 μm. The molecular sieve P, which has been obtained only in large crystallites according to the state of the technology so far, can be prepared according to the invention with a diameter of less than 2 μm, a mean particle diameter of less than 6 μm and a proportion of granules larger than 10 μm amounting to less than 5% by volume.

The sodium aluminosilicates obtained, particularly the molecular sieve types NaA and NaX, find application preferably as heterogeneous inorganic builder substances (phosphate replacements) in washing, rinsing and cleaning agents, in which cases it is of special importance with respect to application technology that the protection of particles with a granule size of more than 25 μm lies below 0.1% by weight.

The described overall course of the process according to the invention for the preparation of crystalline sodium aluminosilicates via spray precipitation can be seen in the flow diagram of FIG. 1. A simplified procedure, as described in the examples, can be used for the preparation of sodium aluminosilicate according to the invention on a laboratory scale.

The examples given below demonostrate the general applicability of the process according to the invention within the scope of molecular sieve syntheses and the smaller particle size of the products obtained in this manner in comparison to those obtained according to the previous state of the technology; however, these examples are not to be deemed limitative in any manner.

EXAMPLES

A simplified procedure with separate spray and crystallizing equipment was used for the performance of the process according to the invention on a laboratory scale. As shown in FIG. 1, the spray equipment includes a reciprocating dosing pump 13 with two heads, whose pistons oscillated in synchronism and are able to feed 40 liters of water each, with a piston stroke distance of 7.5 mm (throughput during operation and standstill is infinitely variable by changing the piston stroke distance from 0 to 15 mm), in addition to the respective spray head aggregate 14 (see separate descriptions). The aluminate and the silicate solutions were filled into 5-liter vessels 10 and 11 respectively, each equipped with a motor and agitator 12, preheated by steam led through immersion coils or jacket 15 and sucked through porcelain frit filters 16a and 16b by the pump 13. An open 5-liter vessel 17 (35 cm high, 20 cm diameter) was used as spray vessel; the spray head aggregate 14 always extended approximately 10 cm into the vessel 17.

When spraying with compressed air, this was led in via a compressed air filter and a reducing station (not shown) permitting the infinite variation of the compressed air between 0 and 5 bar. A resistance heater with carbon ring (not shown) was used to preheat the compressed air, as mentioned in several examples. With a heater temperature of 240° C., the spray head aggregate 14(a) reached 76° C. at 0.5 bar, 73° C. at 1.5 bar, 68° C. at 2.0 bar and 65° C. at 2.5 bar behind the jet aperture, after expansion (without liquid components). Without preheating, the expanded compressed air had a temperature of only 17° C. at 0.5 bar and 15° C. at 2.5 bar. The spray head aggregate 14(b) reached temperatures after expansion under the same conditions that were lower by approximately 2° to 3° C. The open vessel 17 was equipped with a motor and agitator 12. The aluminosilicate suspension formed was passed through a valve into a series of crystallization vessels 18 (only one is shown) equipped with motor and agitator 12 and capable of maintaining a constant elevated temperature.

Crystallization with agitation were performed in 2-liter three-neck glass flasks with a mushroom-shaped heater, contact thermometer, reflux condenser and agitator (teflon blade) under the conditions stated in the examples. In this glass equipment, crystallizations without agitation were carried out only at crystallization temperatures above 90° C.; slow agitation was used until the crystallization temperature was reached. For the crystallization without agitation at lower temperatures of up to 90° C., the precipitation sodium aluminosilicates were filled into polyethylene bottles and crystallized in the loosely closed bottles in the drying oven.

Precipitation amounts of 1,500 gm of gel were each used for the crystallization. After the completed crystallization, 200 ml of suspension were removed, filtered and the solids washed with 60° C. hot deionized water until the wash water showed only a residual akalinity of pH 9 to 10. About 3 liters of water generally were needed for this step.

The washed products were dried over night in the vacuum drying oven at 100° C., well pulverized and identified by their X-ray-diagrams. The composition with respect to alkali, $Al_2O_3$ and $SiO_2$ was determined by x-ray fluorescence analysis. The loss of water after 1 hour of heating at 800° C. is recorded as the moisture content. The dehydrated product weight is used as the weight of active substance (AS).

The crystal habit and the size of the crystallites were determined by a scanning electron microscope. The granule size distribution was measured with the Coulter-Counter ®. The screening residue was determined according to MOCKER using a 25 µm screen, 1 gm of active substance was suspended in 100 ml deionized water, homogenized for 1 minute in an ultrasonic bath, with 5 minutes of wet screening with a water pressure of 4 bar and a flow rate of 400 liters of water per hour and reweighing of the dried screen. The calcium-binding capacity (="CaBC") of the dried products was determined according to DE-OS No. 2 412 837 (p. 27) at 22°±2° C., with 1 gm of active substance per liter and water of 30° dH initial hardness after 10 minutes and recorded as "mg CaO/gm AS" (AS=active substance).

Technical grade water glass solution (filtered) or solid, water-soluble sodium silicate (technical grade "sodium metasilicate") was used as the silicate component in the examples. The utilized water glass contained 8.0% $Na_2O$ and 26.9% $SiO_2$, the solid silicate contained 50.9% $Na_2O$ and 47.8% $SiO_2$.

Technical grade sodium metaaluminate with about 41% $Na_2O$ and 55% $Al_2O_3$ or Hydrargillite with about 65% $Al_2O_3$ was used as the aluminate component. These solids were dissolved at the boiling temperature with the amounts of water and alkali metal hydroxide solution (technical grades) given in the examples. Insoluble residues were filtered off. The $Na_2O$ and $Al_2O_3$ contents of the resulting alkaline aluminum solutions were determined by titration because of variations in the composition of the starting components.

All percentages are in % by weight, all ratios are molar ratios.

The spray head aggregates 14a and 14b used in the examples are described below. These are always commercial jets. As mentioned in the text, the process according to the invention is not limited to these types of aggregates, however. The jets selected for the examples are particularly suitable for obtaining reproducible results on the laboratory scale as well.

Spray Aggregate 14a (FIG. 2)

This aggregate, shown in cross-section in FIG. 2, is assembled as a three-component jet; atomization takes place outside the jet. Two of the introduced components (compressed air and one liquid component) are subjected to a twisting motion prior to meeting.

A straight channel 2 without twisting elements and with a constant bore of 1.0 mm diameter leads along the longitudinal axis of the jet. Only this channel has a cross-section that cannot be varied. The other two channels, 1 and 3, are arranged concentrically to the former as ring channels. The components are led in from the side. The outer ring channel 3, with a maximal aperture width of 1.5 mm (circular slit with 15 mm outside diameter and 12 mm inside diameter) is for compressed air, the middle ring channel 1 with the same maximal aperture width of 1.5 mm (circular slit with 7 mm outside diameter and 4 mm inside diameter) is for the second liquid component. These two concentric ring channels 1 and 3 have twisting causing bodies 4 and become concentrically narrower at the mouth of the jet. The concentric ring channels can be made narrower or closed with a thumbscrew with a scale (not shown). The arrangement of the channels is shown in FIG. 2 is simplified form.

This three-component jet sprays a circular full cone. The concentric ring channels 1 and 3 were adjusted for the given examples so that the various spray angles stated there were produced.

Spary Aggregate 14b (FIG. 3)

This aggregate, shown in cross-section in FIG. 3, is assembled as three-component jet; atomization takes place outside the jet. Two of the introduced components (compressed air and one liquid component) are twisted prior to meeting. This jet largely corresponds to spray aggregate 14a with respect to the working principle, but is suitable for much greater throughput quantities.

The compressed gas and one liquid component are introduced from the side, the other liquid component from above. Channel 2 in the longitudinal axis of the jet has a diameter of 10 mm and is conically reduced to 3 mm at the mouth of the jet. Ring channel 3 with built-in twisting body 4 for the liquid component introduced from the side, which is concentric to the former, has a maximal aperture width of 1.0 mm (circular slit with 17 mm outside diameter and 15 mm inside diameter). The outside diameter of the ring slit is conically reduced to 8 mm, with variable inside diameter (depending on the setting of the centric channel), at the mouth of the jet. The compressed air is introduced through 1 with twisting body 4. The outside diameter of the conical ring channel 1 is reduced from 28 mm to 14 mm at a maximal aperture width of 3 mm, depending on the adjustment of the cone. The arrangement of the channels is shown in simplified form in FIG. 3.

This three-component jet sprays a circular full cone.

EXAMPLES 1a–1d

These examples demonstrate the preparation of highly crystalline zeolite sodium aluminosilicate of the type NaA with constant batch ratios and varied spray conditions. The aluminate solutions were prepared from hydrargillite and sodium hydroxide solution, contained 13.52% $Na_2O$ and 9.67% $Al_2O_3$, corresponding to molar ratios of 1.0 $Al_2O_3$: 2.3 $Na_2O$: 45 $H_2O$, and were dosed at 25.0 kg per hour. The silicate solutions were obtained by diluting water glass solution with sodium hydroxide solution to contain 6.84% $Na_2O$ and 9.18% $SiO_2$, corresponding to molar ratios of 1.8 $SiO_2$: 1.3 $Na_2O$: 55 $H_2O$, and were dosed at 27.92 kg per hour. The total precipitation batch (before spraying and evaporation of water) had the corresponding molar ratios of 3.6 $Na_2O$: 1.0 $Al_2O_3$: 1.8 $SiO_2$:100 $H_2O$.

Spray head aggregate 14a was used for spraying. A varying loss of water in the sprayed batch and thus a varying water content in the crystallization batch resulted from the different temperature and compressed air settings.

The products of type NaA obtained after crystallization at 85° C. with agitation had a composition of 1.0 $Na_2O$: 1.0 $Al_2O_3$: 1.8 $SiO_2$: 3.5 to 3.9 $H_2O$, corresponding with only minor differences with respect to water content. The scanning electron microscope pictures always showed cube-shaped crystallites with edges that were 0.3 to 1.2 $\mu m$ long and rounded. The products were highly crystalline according to their x-ray-diffraction diagrams and not contaminated by other crystalline species.

EXAMPLE 1a

Reaction Conditions

Temperature of the liquid components: 75° C.
Spray conditions:
  spray head aggregate 14a,
  compressed air at 0.5 bar, not preheated,
  spray angle 95°,
  temperature of spray precipitation: 66° C.,
  loss of water: 2.1 kg per hour
Crystallization batch: 3.6 $Na_2O$:1.0 $Al_2O_3$:1.8 $SiO_2$:95 $H_2O$
Crystallization time: 30 minutes

Characteristics of Product

Product type: highly crystalline molecular sieve NaA
Composition: 1.0 $Na_2O$:1.0 $Al_2O_3$:1.8 $SiO_2$:3.9 $H_2O$
Water content: 20.5%
Ca-binding capacity: 159 mg CaO/gm AS
Wet 25 $\mu m$ screening residue: 0.04%
Granule size distribution:
  distribution maximum at 2.5 to 3.2 $\mu m$
  mean granule diameter approx. 2.9 $\mu m$
  Proportions
    >10 $\mu m$: 1% by volume
    >5 $\mu m$: 4% by volume
    >3 $\mu m$: 42% by volume
    >2 $\mu m$: 92% by volume

EXAMPLE 1b

Reaction Conditions

Temperature of the liquid components: 75° C.
Spray conditions:
  spray head aggregate 14a,
  compressed air at 2.5 bar, not preheated,
  spray angle 72°,
  temperature of spray precipitation: 60° C.,
  loss of water: 8.5 kg per hour
Crystallization batch: 3.6 $Na_2O$:1.0 $Al_2O_3$:1.8 $SiO_2$:80 $H_2O$
Crystallization time: 30 minutes

Characteristics of Product

Product type: highly crystalline molecular sieve NaA
Composition: 1.0 $Na_2O$:1.0 $Al_2O_3$:1.8 $SiO_2$:3.6 $H_2O$
Water content: 19.2%
Ca-binding capacity: 160 mg CaO/gm AS
Wet 25 $\mu m$ screening residue: 0.09%
Granule size distribution:
  distribution maximum at 2.0 to 2.5 $\mu m$
  mean granule diameter approximately 2.7 $\mu m$
  Proportions
    >10 $\mu m$: 1% by volume
    >5 $\mu m$: 2% by volume
    >3 $\mu m$: 22% by volume
    >2 $\mu m$: 85% by volume

EXAMPLE 1c

Reaction conditions

Temperature of the liquid components: 65° C.
Spray conditions:
 spray head aggregate 14a,
 compressed air at 1.0 bar, preheated (65° C. behind jet mouth),
 spray angle 78°,
 temperature of spray precipitation: 60° C.,
 loss of water: 12.8 kg per hour
Crystallization batch: 3.6 $Na_2O$:1.0 $Al_2O_3$:1.8 $SiO_2$:70 $H_2O$
Crystallization time: 15 minutes

Characteristics of Product

Product type: highly crystalline molecular sieve NaA
Composition: 1.0 $Na_2O$:1.0 $Al_2O_3$:1.8 $SiO_2$:3.8 $H_2O$
Water content: 20.1%
Ca-binding capacity: 150 mg CaO/gm AS
Wet 25 μm screening residue: 0.10%
Granule size distribution:
 distribution maximum at 1.6 to 2.0 μm
 mean granule diameter approximately 2.0 μm
 Proportions
  >10 μm: 2% by volume
  >5 μm: 3% by volume
  >3 μm: 6% by volume
  >2 μm: 41% by volume

EXAMPLE 1d

Reaction conditions

Temperature of the liquid components: 92° C.
Spray conditions:
 spray head aggregate 14a,
 compressed air at 2.0 bar, not preheated,
 spray angle 88°,
 temperature of spray precipitation: 63° C.,
 loss of water: 7.3 kg per hour
Crystallization batch: 3.6 $Na_2O$:1.0 $Al_2O_3$:1.8 $SiO_2$:83 $H_2O$
Crystallization time: 30 minutes

Characteristics of Product

Product type: highly crystalline molecular sieve NaA
Composition: 1.0 $Na_2O$:1.0 $Al_2O_3$:1.8 $SiO_2$:3.5 $H_2O$
Water content: 18.8%
Ca-binding capacity: 150 mg CaO/gm AS
Wet 25 μm screening residue: 0.01%
Granule size distribution:
 distribution maximum at 2.0 to 2.5 μm
 mean granule diameter approximately 2.7 μm
 Proportions
  >10 μm: <1% by volume
  >5 μm: 1% by volume
  >3 μm: 20% by volume
  >2 μm: 83% by volume

EXAMPLE 2

An aluminate solution with 3.27% $Na_2O$ and 3.71% $Al_2O_3$, corresponding to molar ratios of 1.45 $Na_2O$:1.0 $Al_2O_3$:142 $H_2O$ was prepared from hydragillite and sodium hydroxide solution. A silicate solution with 9.49% $SiO_2$ and 9.80% $Na_2O$, was prepared by dissolving metasilicate in water. The aluminate solution was dosed at 27.5 kg per hour, the silicate solution at 23.43 kg per hour, so that a total batch with the molar ratios of 5.15 $Na_2O$:1.0 $Al_2O_3$:3.7 $SiO_2$:247 $H_2O$ resulted.

The two components were preheated to 90° C. and atomized at the spray head aggregate 14a with 2.0 bar compressed air (not preheated). From these spray conditions, a spray angle of 72°, a temperature of 75° C. for the sprayed batch, and a loss of water of 14.8 kg per hour, resulted. The batch obtained after spraying had a molar ratio of $H_2O$:$Al_2O_3$=165.

The immediately forming gel was crystallized at boiling temperature for 4 hours without agitating. The product was identified as highly crystalline molecular sieve NaX by radiography after washing and drying. The calcium-binding capacity was relatively low at 118 mg CaO/gm AS based on the composition rich in silicate, corresponding to 1.0 $Na_2O$:1.0 $Al_2O_3$:3.0 $SiO_2$:4.0 $H_2O$.

Distribution maximum: 2.0 to 2.6 μm
Mean granule diameter: 2.7 μm
Granule size distribution: granule proportions
 >10 μm: 1% by volume
 >5 μm: 2% by volume
 >3 μm: 23% by volume
 >2 μm: 83% by volume
Wet 25 μm screening residue: 0.08%

The scanning electron microscope pictures showed distinct, cuboid crystallites with rounded edges and a diameter of approximately 0.4 to 1.5 μm.

EXAMPLE 3

An aluminate solution with 6.6% $Na_2O$ and 7.7 $Al_2O_3$, corresponding to molar ratios of 1.4 $Na_2O$:1.0 $Al_2O_3$:63 $H_2O$, was prepared from hydrargillite and sodium hydroxide solution. A silicate solution with 3.72% $Na_2O$ and 9.84% $SiO_2$, corresponding to molar ratios of 1.1 $Na_2O$:3.0 $SiO_2$:88 $H_2O$, was prepared by diluting water glass solution with sodium hydroxide solution. The aluminate solution was dosed at 16.9 kg per hour, the silicate solution at 23.4 kg per hour, so that a total batch with the molar ratios of 2.5 $Na_2O$:1.0 $Al_2O_3$:3.0 $SiO_2$:151 $H_2O$ resulted.

The two components were preheated to 80° C. and atomized simultaneously through spray head aggregate 14a with 2.0 bar compressed air (not preheated). These spray conditions produced a spray angle of 70°, a temperature of 65° C. for the sprayed batch, and a loss of water of 8.2 kg per hour. The batch obtained after spraying thus had a molar ratio of $H_2O$:$Al_2O_3$=116.

The gel obtained by spraying was crystallized at boiling temperature for 5 hours, without agitating. After washing and drying, the product was identified by radiography as highly crystalline molecular sieve NaX.

Composition: 1.0 $Na_2O$: 1.0 $Al_2O_3$: 2.8 $SiO_2$: 4.9 $H_2O$
Water content: 21.0%
Ca-binding capacity: 121 mg CaO/gm AS
Wet 25 μm screening residue: 0.01%
Distribution maximum: 2.0 to 2.5 μm
Mean granule diameter: 2.3 μm
Granule size distribution: granule proportions
 >10 μm: <1% by volume
 >5 μm: 1% by volume
 >3 μm: 13% by volume
 >2 μm: 75% by volume The scanning electron microscope pictures showed distinct, relatively sharp-edged, cuboid crystallites with a length of predominant 1.0 to 1.5 μm for the edge.

EXAMPLE 4

An aluminate solution with 3.08% $Al_2O_3$ and 8.65% $Na_2O$, corresponding to molar ratios of 4.62 $Na_2O$:1.0 $Al_2O_3$:163 $H_2O$, was prepared from sodium metaaluminate and sodium hydroxide solution. A water glass solution was diluted to 5.33% $Na_2O$ and 17.92% $SiO_2$, corresponding to molar ratios of 2.88 $Na_2O$:10.0 $SiO_2$:143 $H_2O$. The aluminate solution was dosed at 19.9 kg per hour, the silicate solution at 20.1 kg per hour, so that a total batch with the molar ratios of 7.5 $Na_2O$:1.0 $Al_2O_3$10.0 $SiO_2$:10.0 $SiO_2$:306 $H_2O$ resulted.

The two components were preheated to 85° C. and simultaneously atomized through spray head aggregate 14a, with 2.0 bar compressed air (preheated). From these spray conditions, a spray angle of 64°, a temperature of 78° C. for the sprayed batch, and a loss of water of 12.8 kg per hour, resulted. The batch collected after spraying, thus had a molar ratio of $H_2I:Al_2O_3 = 187$.

The gel obtained by spraying was crystallized for 16 hours at the boiling temperature with refluxing and agitation. After washing and drying, the product was identified as highly crystalline molecular sieve P (cubic cation-exchanging modification) by radiography.
Composition: 1.0 $Na_2O$: 1.0 $Al_2O_3$: 3.7 $SiO_2$: 4.3 $H_2O$
Water content: 16.7%
Ca-binding capacity: 122 mg CaO/gm AS
Wet 25 μm screening residue:
 0.08%
Distribution maximum: 5 to 6 μm
Mean granule diameter: 5.8 μm
Granule size distribution: granule proportions
 >10 μm: 3% by volume
 >7 μm: 30% by volume
 >5 μm: 62% by volume
 >3 μm: 90% by volume The scanning electron microscope pictures showed the characteristically structured sphere-shaped crystallites with a diameter of mainly 1.0 to 1.5 μm, only.

EXAMPLE 5

An aluminate solution with 6.33% $Al_2O_3$ and 5.46% $Na_2O$, corresponding to molar ratios of 1.0 $Al_2O_3$:1.42 $Na_2O$:79 $H_2O$, was prepared from hydrargillite and sodium hydroxide solution. A silicate solution with 5.33% $Na_2O$ and 17.92% $SiO_2$, corresponding to molar ratios of 2.88 $Na_2O$:10 $SiO_2$:143 $H_2O$, was prepared by diluting a water glass solution with water. The aluminate solution was dosed at 13.6 kg per hour, the silicate solution at 28.6 kg per hour, so that a total batch with the molar ratios 4.3 $Na_2O$:1.0 $Al_2O_3$:10 $SiO_2$:222 $H_2O$ resulted.

The two components were preheated to 40° C. and simultaneously atomized through spray head aggregate 14a, with 2.0 bar compressed air (not preheated). From the jet setting and the given spray conditions, a spray angle of 63°, a temperature of 23° C. for the sprayed batch, and a loss of water of 3.7 kg per hour, resulted. The batch collected after spraying, thus had a molar ratio of $H_2O:Al_2O_3 = 198$.

The gel obtained by spraying was crystallized for 8 hours at the boiling temperature with refluxing and agitation. After washing and drying, the product was identified as highly crystalline molecular sieve P (cubic and thus cation-exchanging modification) by radiography.
Composition: 1.0 $Na_2O$: 1.0 $Al_2O_3$: 4.5 $SiO_2$: 4.7 $H_2O$
Water content: 16.3%
Ca-binding capacity: 103 mg CaO/gm AS
Wet 25 μm screening residue:
 0.09%
Distribution maximum: 5 to 6 μm
Mean granule diameter: 5.2 μm
Granule size distribution: granule proportions
 >10 μm: 2% by volume
 >7 μm: 18% by volume
 >5 μm: 60% by volume
 >3 μm: 92% by volume The scanning electron microscope pictures showed extremely small spherical crystallites with almost all diameters below 1 μm.

EXAMPLES 6a–6c

These examples were performed analogous to Examples 1a–1c, but with the use of spray head aggregate 14b. The different spraying conditions are given below. The products obtained after crystallization at 85° C. with agitation were highly crystalline, despite extremely short crystallization times, and contained no other crystalline components besides molecular sieve NaA, according to their x-ray diffraction diagrams. The chemical composition of the products, with molar ratios of 1.0 $Na_2O$:1.0 $Al_2O_3$:1.8 $SiO_2$:3.4 to 3.5 $H_2O$, differed only slightly with respect to water content, within the range of analytical accuracy. The scanning electron microscope pictures always showed cube-shaped crystallites with lengths of 0.3 to 1.2 μm with the rounded edges.

EXAMPLE 6a

Reaction conditions

Temperature of the liquid components: 80° C.
Spray conditions:
 spray head aggregate 14b,
 compressed air at 1.0 bar, not preheated,
 spray angle 75°,
 temperature of spray precipitation: 55° C.,
 loss of water: 3.4 kg per hour
Crystallization batch: 3.6 $Na_2O$:1.0 $Al_2O_3$:1.8 $SiO_2$:92 $H_2O$
Crystallization time: 20 minutes Characteristics of Product Product type: highly crystalline molecular sieve NaA
Composition: 1.0 $Na_2O$: 1.0 $Al_2O_3$: 1.8 $SiO_2$: 3.4 $H_2O$
Water content: 18.4%
Ca-binding capacity: 162 mg CaO/gm AS
Wet 25 μm screening residue: 0.03%
Granule size distribution:
 distribution maximum at 2.0 to 2.5 μm
 mean granule diameter approximately 2.5 μm
 proportions
  >10 μm: 2% by volume
  >5 μm: 9% by volume
  >3 μm: 16% by volume
  >2 μm: 79% by volume

EXAMPLE 6b

Reaction conditions

Temperature of the liquid components: 80° C.
Spray conditions:

spray head aggregate 14b,
compressed air at 2.5 bar, preheated,
spray angle 64°,
temperature of spray precipitation: 51° C.,
loss of water: 8.5 kg per hour
Crystallization batch: 3.6 $Na_2O$: 1.0 $Al_2O_3$: 1.8 $SiO_2$: 80 $H_2O$
Crystallization time: 10 minutes

Characteristics of Product

Product type: highly crystalline molecular sieve NaA
Composition: 1.0 $Na_2O$: 1.0 $Al_2O_3$: 1.8 $SiO_2$: 3.5 $H_2O$
Water content: 18.8%
Ca-binding capacity: 156 mg CaO/gm AS
Wet 25 μm screening residue: 0.01%
Granule size distribution:
    distribution maximum at 1.6 to 2.0 μm
    mean granule diameter approximately 2.2 μm
    proportions
        >10 μm: 1% by volume
        >5 μm: 2% by volume
        >3 μm: 7% by volume
        >2 μm: 62% by volume

EXAMPLE 6c

Reaction conditions

Temperature of the liquid components: 90° C.
Spray conditions:
    spray head aggregate 14b,
    compressed air at 2.0 bar, preheated,
    spray angle 72°,
    temperature of spray precipitation: 63° C.,
    loss of water: 6.8 kg per hour
Crystallization batch: 3.6 $Na_2O$: 1.0 $Al_2O_3$: 1.8 $SiO_2$: 84 $H_2O$
Crystallization time: 10 minutes

Characteristics of Product

Product type: highly crystalline molecular sieve NaA
Composition: 1.0 $Na_2O$: 1.0 $Al_2O_3$: 1.8 $SiO_2$: 3.5 $H_2O$
Water content: 18.8%
Ca-binding capacity: 158 mg CaO/gm AS
Wet 25 μm screening residue: 0.02%
Granule size distribution:
    distribution maximum at 2.0 to 2.5 μm
    mean granule diameter approximately 2.5 μm
    proportions
        >10 μm: 2% by volume
        >5 μm: 5% by volume
        >3 μm: 25% by volume
        >2 μm: 79% by volume The preceding specific embodiments are illustrative of the practice of the invention. It is to be understood, however, that other expedients known to those skilled in the art or disclosed herein, may be employed without departing from the spirit of the invention or the scope of the appended claims.

We claim:

1. A process for the preparation of fine droplet-reacted sodium aluminosilicates with the smallest particle sizes, containing less than 0.1% by weight of granules exceeding 25 μm in size, said aluminosilicates being insoluble in water and containing some bound water, of the general formula

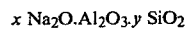

$$x\ Na_2O \cdot Al_2O_3 \cdot y\ SiO_2$$

in which x is a number from 0.2 to 1.5 and y is a number from 1.5 to 10, prepared by reacting aqueous sodium aluminate with aqueous sodium silicate in the presence of an excess of aqueous sodium hydroxide and subsequent filtration, comprising the step of separately passing a solution of sodium aluminate with a composition corresponding to the molar ratios:

$$1\ Al_2O_3:1\ to\ 10\ Na_2O:20\ to\ 200\ H_2O$$

and a solution of sodium silicate with a composition corresponding to the molar ratios:

$$Na_2O:SiO_2\ from\ 0.1\ to\ 10\ and$$

$$H_2O:SiO_2\ from\ 5\ to\ 200$$

to a spray head, spraying the two solutions into intimate contact, at a ratio by weight corresponding the desired total composition within the molar ratios of:

$$1.5\ to\ 15\ Na_2O:1\ Al_2O_3:1\ to\ 15\ SiO_2:50\ to\ 400\ H_2O$$

at a temperature of between 0° and 103° C., employing a spray system with at least one spray head with at least two liquid channels, each terminating in a jet spray nozzle, one for each solution, in such a manner that the two solutions meet only after leaving the spray head at a velocity sufficient to form a fine mist of droplets, whereby the two reactants undergo reaction while still in the fine mist of droplets stage, with the formation of an X-ray-amorphous sodium aluminosilicate gel, allowing the droplets to settle and recovering an aqueous suspension of said X-ray-amorphous sodium aluminosilicate in a form adapted for crystallization.

2. The process of claim 1 wherein said two solutions meet after leaving the spray head, with an inert compressed gas stream, whereby said gas stream is forced from a jet spray nozzle under pressures of from 0.3 to 3 bar.

3. The process of claim 2 wherein said inert compressed gas stream is preheated.

4. The process of claim 2 or 3 wherein said inert compressed gas is air.

5. The process of claim 2 wherein said spray head contains two channels and one compressed gas channel, each terminating in a jet spray nozzle.

6. The process of claim 1 or 2 wherein said aqueous suspension of x-ray-amorphous sodium aluminosilicate in gel form is heated, optionally with agitation, to a temperature between 20° C. and 150° C. for a time sufficient to effect crystallization.

7. The process of claim 1 or 2 wherein the amount of $Al_2O_3$ and $SiO_2$ in said aluminate solution and said silicate solution, respectively, are adjusted in such a manner that the desired ratio in the sodium aluminosilicate is produced.

8. The process of claim 1 or 2 wherein said aluminate solution corresponds to the molar ratio $$1\ Al_2O_3:1\ to\ 4\ Na_2O:20\ to\ 200\ H_2O,$$

said silicate solution corresponds to the molar ratio $$Na_2O:SiO_2\ from\ 0.1\ to\ 3\ and$$

$$H_2O:SiO_2\ from\ 5\ to\ 50,$$

and these solutions are sprayed together in a weight ratio corresponding to a total aluminosilicate composition molar ratio 1.8 to 6 $Na_2O$:1 $Al_2O_3$:1 to 2.4 $SiO_2$:50 to 300 $H_2O$.

9. The process of claim 8 wherein said aluminosilicate composition recovered as gel is heated and maintained at a temperature of from 70° C. to 95° C. for at least 10 minutes until a crystalline sodium aluminosilicate of type NaA with a molar ratio of $SiO_2$:$Al_2O_3$ from 1.8 to 2.2 and a mean particle size of less than 3 μm is formed.

10. The process of claim 9 wherein the calculated total composition of the two solutions to be sprayed is adjusted so that it corresponds to the molar ratio of 3 to 4 $Na_2O$:1 $Al_2O_3$:1.8 to 2 $SiO_2$:80 to 100 $H_2O$.

11. The process of claim 8 wherein said fine mist of droplets formed have a temperature of from 60° C. to 80° C.

12. The process of claim 1 or 2 wherein said aluminate solution corresponds to the molar ratio 1 $Al_2O_3$:1 to 5 $Na_2O$:20 to 200 $H_2O$, said silicate solution corresponds to the molar ratio $Na_2O$:$SiO_2$ from 0.1 to 3 and $H_2O$:$SiO_2$ from 5 to 100, and these solutions are sprayed together in a weight ratio corresponding to a total aluminosilicate composition molar ratio 2.5 to 10 $Na_2O$:1 $Al_2O_3$:2.5 to 10 $SiO_2$:80 to 100 $H_2O$.

13. The process of claim 12 wherein said aluminosilicate composition recovered as a gel is heated and maintained at a temperature in the range from 85° C. to 105° C. for at least one hour, until a crystalline sodium aluminosilicate of type NaX with a molar ratio of $SiO_2$:$Al_2O_3$ from 2.4 to 3.2 and a mean particle size of less than 2 μm is formed.

14. The process of claim 13 wherein the calculated total composition of the two solutions to be sprayed is adjusted so that it corresponds to molar ratios of $SiO_2$:$Al_2O_3$ from 2.5 to 6

$Na_2O$:$SiO_2$ from 1.2 to 1.5

$H_2O$:$SiO_2$ from 35 to 100.

15. The process of claim 12 wherein said fine mist of droplets formed have a temperature of from 60° C. to 95° C.

16. The process of claim 1 or 2 wherein said aluminate solution corresponds to the molar ratio 1 $Al_2O_3$:1 to 5 $Na_2O$:20 to 200 $H_2O$ said silicate solution corresponds to the molar ratio $Na_2O$:$SiO_2$ from 0.1 to 3 and $H_2O$:$SiO_2$ from 5 to 100, and these solutions are sprayed together in a weight ratio corresponding to a total aluminosilicate composition molar ratio 1.5 to 10 $Na_2O$:1 $Al_2O_3$:3 to 10 $SiO_2$:100 to 400 $H_2O$.

17. The process of claim 16 wherein said aluminosilicate composition recovered as a gel is heated and maintained at a temperature in the range from 90° C. to 105° C. for at least one hour, until a crystalline sodium aluminosilicate of type P of the cubic-cation-exchanging system with a molar ratio of $SiO_2$:$Al_2O_3$ from 2.7 to 5.2 and a mean particle size of less than 6 μm is formed.

18. The process of claim 17 wherein the calculated total composition of the two solutions to be sprayed is adjusted so that it corresponds to a molar ratio of $SiO_2$:$Na_2O$ from 1 to 2.5.

19. The process of claim 17 or 18 wherein said fine mist of droplets formed have a temperature of from 60° C. to 100° C.

* * * * *